(No Model.)
M. LARA.
CANTEEN.
No. 517,108.                    Patented Mar. 27, 1894.
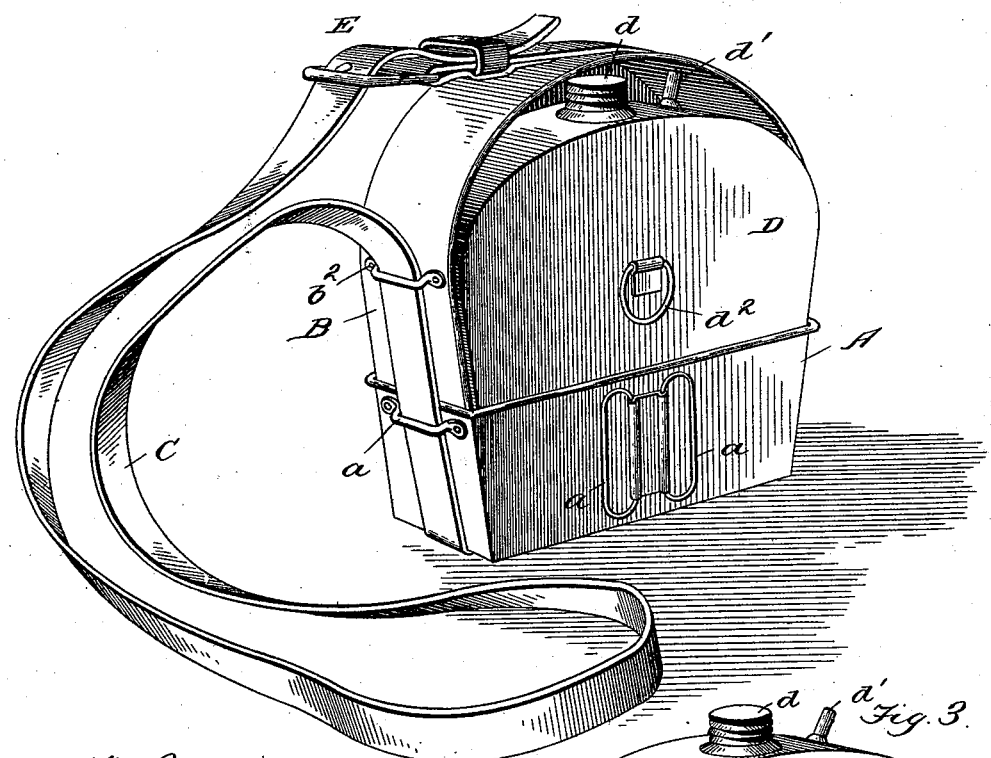
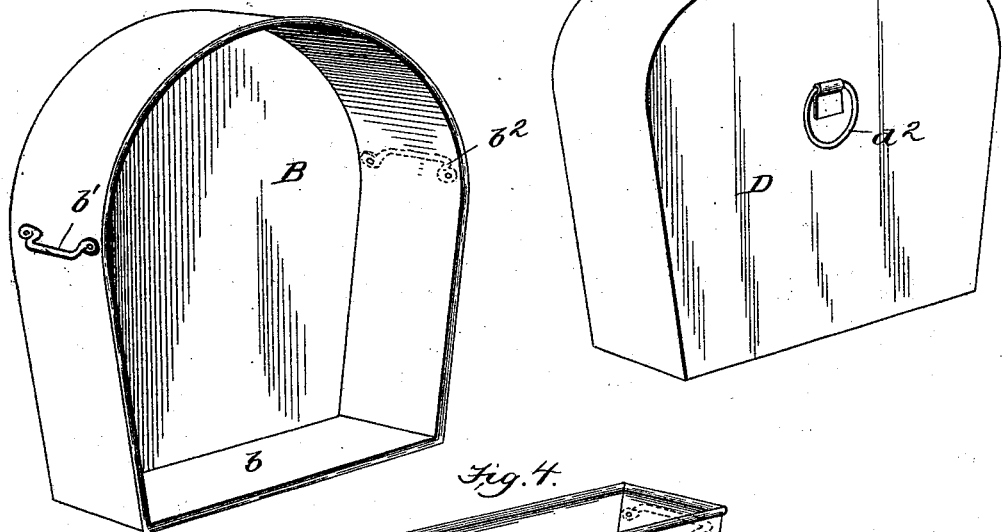
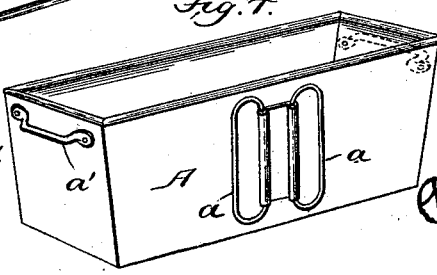

UNITED STATES PATENT OFFICE.

MANUEL LARA, OF MEXICO, MEXICO.

CANTEEN.

SPECIFICATION forming part of Letters Patent No. 517,108, dated March 27, 1894.

Application filed September 28, 1893. Serial No. 486,706. (No model.) Patented in Mexico March 21, 1893, No. 421.

*To all whom it may concern:*

Be it known that I, MANUEL LARA, a citizen of the Republic of Mexico, residing at the city of Mexico, in the Republic of Mexico, have invented certain new and useful Improvements in Canteens, (for which I have received Letters Patent in Mexico, No. 421, dated March 21, 1893,) of which the following is a specification, reference being had therein to the accompanying drawings.

This invention pertains to certain new and useful improvements in canteens, having for its object the production of a new and improved canteen for soldiers, which shall combine certain cooking utensils needed when on field duty, and also a dish and cup for eating and drinking purposes.

In actual field service it is necessary to transport from place to place, suitable pans, utensils, &c., to enable the soldiers to cook their own food, and the object of my invention is to combine with a canteen such utensils as are essential for such purpose and by means of which each soldier will always have with him the proper vessels for readily and easily preparing his meals.

The invention consists of the combination with a canteen of one or more pans which will inclose said canteen and a strap engaging said pan or pans and by which the whole is carried.

The invention further consists of a rectangular pan, a second pan of approximately U-shape supported by said rectangular pan, and the canteen fitting in said U-shape pan, the whole being supported by a strap passed through eyes of both of said pans, substantially as hereinafter fully set forth and particularly pointed out in the claims.

In the accompanying drawings:—Figure 1 is a view in perspective of my invention packed for transportation. Fig. 2 is a view of the U-shape pan. Fig. 3 is a view of the canteen. Fig. 4 is a view of the rectangular pan.

Referring to the drawings, A designates a rectangular pan having handles $a$ on its sides for the easy manipulation thereof, and eyes or loops $a'$ on its ends.

B is a second pan of approximately U-shape and having a flat end $b$ and slightly tapering sides $b'$, for accommodating itself to pan A when packed for transportation. This pan is also provided with eyes or loops $b^2$ secured to sides $b'$.

The canteen D is of a shape corresponding to pan B and is provided with a screw top $d$ and a tube or spout $d'$, the former being used in filling the canteen and the latter is used in emptying. A ring $d^2$ is fastened to said canteen to facilitate taking the same out of pan B when unpacking.

C is a strap whereby the canteen and its adjuncts are carried by the soldier or other person. Said strap is passed beneath pan A and up through the coincident eyes or loops $a'$ and $b^2$, the ends of said strap being united by a buckle E. In this way the two pans are held together and the canteen is securely retained in place, it being necessary to loosen the strap and disengage the pans in order to remove the canteen.

The manner of packing my invention for transportation will be readily understood from Fig. 1. The canteen is first placed in pan B and then the latter is inserted in pan A. The strap C is then drawn through the eyes or loops of the two pans and then thrown over the shoulder of the person who is to carry the same.

The advantages of my invention are apparent to those skilled in the art to which it appertains and it will be readily seen that the combined elements can be quickly packed or unpacked, as occasion requires.

The invention is also extremely simple, cheap and durable and greatly enhances the value and serviceability of the canteen.

It will be seen that I have produced a "kit" which is compact and complete and that any accidental disengagement of the parts is prevented.

I claim as my invention—

1. The combination of the canteen, the U-shape pan or vessel corresponding thereto and inclosing the same, the rectangular pan or vessel fitting over and inclosing one end of said former pan, and means for connecting said pans or vessels, substantially as set forth.

2. The combination of the canteen, the U-shape pan or vessel corresponding thereto and inclosing the same, the rectangular pan or vessel fitting over and inclosing one end of said pan or vessel and canteen, and the suspending strap connecting said pans or vessels, substantially as set forth.

3. The combination of the canteen, the U-shape pan or vessel corresponding thereto and inclosing the same and having eyes or loops on its sides, the rectangular pan or vessel fitting over and inclosing one end of said U-shape pan or vessel and also having eyes or loops on its ends, and the strap passed through said eyes or loops of both of said pans or vessels, substantially as set forth.

In testimony whereof I affix my signature in presence of two witnesses.

MANUEL LARA.

Witnesses:
ALFRED J. O'FARRELL,
PATRICK H. O'FARRELL.